(12) United States Patent
Malone et al.

(10) Patent No.: US 7,031,672 B2
(45) Date of Patent: Apr. 18, 2006

(54) DIRECT CONVERSION TRANSMITTER SYSTEM AND METHOD WITH QUADRATURE BALANCING AND LOW LO FEED THROUGH

(75) Inventors: Lawrence J. Malone, Carlsbad, CA (US); Lon W. Christensen, San Diego, CA (US)

(73) Assignee: Quorum Systems, inc., San Diego, CA (US)

( * ) Notice: Subject to any disclaimer, the term of this patent is extended or adjusted under 35 U.S.C. 154(b) by 0 days.

(21) Appl. No.: 10/807,207

(22) Filed: Mar. 22, 2004

(65) Prior Publication Data

US 2005/0032486 A1    Feb. 10, 2005

Related U.S. Application Data

(60) Provisional application No. 60/458,621, filed on Mar. 31, 2003.

(51) Int. Cl.
    *H04B 1/04*    (2006.01)
(52) U.S. Cl. ............... 455/110; 455/113; 455/118; 455/76
(58) Field of Classification Search ........... 455/110, 455/111, 112, 113, 118, 119, 91, 102, 73, 455/86, 76, 11.1, 93; 375/322, 367, 298; 370/335, 297
    See application file for complete search history.

(56) References Cited

U.S. PATENT DOCUMENTS

| | | | |
|---|---|---|---|
| 4,095,047 A * | 6/1978 | von Pieverling et al. ... 375/367 |
| 4,677,686 A * | 6/1987 | Hustig et al. ............... 370/297 |
| 5,194,823 A * | 3/1993 | Wendt et al. ............. 455/127.3 |
| 5,235,340 A * | 8/1993 | Shea ........................... 342/188 |
| 5,509,033 A * | 4/1996 | Chen .......................... 375/298 |
| 5,710,983 A * | 1/1998 | Faber ........................... 455/76 |
| 5,896,562 A * | 4/1999 | Heinonen ..................... 455/76 |
| 6,016,422 A * | 1/2000 | Bartusiak ..................... 455/86 |
| 6,055,429 A * | 4/2000 | Lynch ....................... 455/11.1 |
| 6,064,664 A * | 5/2000 | Kim ........................... 370/335 |
| 6,192,225 B1 | 2/2001 | Arpaia et al. |
| 6,308,058 B1 | 10/2001 | Souetinov et al. |
| 6,385,439 B1 * | 5/2002 | Hellberg ..................... 455/118 |
| 6,487,398 B1 * | 11/2002 | Nobbe et al. ............... 455/119 |
| 8,545,516 | 4/2003 | Ylamurto et al. |
| 6,597,899 B1 | 7/2003 | Soutetinov et al. |
| 6,665,159 B1 * | 12/2003 | Takikawa et al. ............. 361/56 |
| 6,728,517 B1 * | 4/2004 | Sugar et al. .................. 455/73 |
| 6,738,604 B1 * | 5/2004 | Swazey ...................... 455/118 |
| 6,785,529 B1 | 8/2004 | Ciccarelli et al. |
| 2003/0027534 A1 * | 2/2003 | Swazey ...................... 455/118 |
| 2004/0192229 A1 * | 9/2004 | Morris et al. ................. 455/91 |
| 2005/0118977 A1 * | 6/2005 | Drogi et al. ................. 455/323 |

OTHER PUBLICATIONS

Behzad Razavi, RF Microelectronics, 1998, Prentice-Hall, Inc., Edition 10, p. 103.*

* cited by examiner

*Primary Examiner*—Lana Le
(74) *Attorney, Agent, or Firm*—Townsend and Townsend and Crew

(57) ABSTRACT

A system and method are provided for communicating a radio frequency (RF) signal. In use, a baseband signal is mixed with a plurality of oscillator signals with different phases in an interleaving manner. The mixed baseband signal is then communicated as an RF signal.

12 Claims, 7 Drawing Sheets

DIRECT CONVERSION TRANSMITTER SYSTEM AND METHOD WITH QUADRATURE BALANCING AND LOW LO FEED THROUGH

RELATED APPLICATION(S)

This application claims the benefit of U.S. Provision Application No. 60/458,621, filed Mar. 31, 2003, entitled DIRECT CONVERSION TRANSMITTER WITH QUADRATURE BALANCING AND LOW LO FEEDTHROUGH.

FIELD OF THE INVENTION

The present invention relates to circuitry, and more particularly to direct-conversion circuitry.

BACKGROUND OF THE INVENTION

Direct-conversion is an alternative wireless transmitter architecture to the well-established superheterodyne, particularly for highly integrated, low-power terminals. Its fundamental advantage is that the transmitted signal is mixed directly to radio frequency (RF) without the use of an intermediate frequency. This means less hardware complexity, lower component count and a simpler frequency plan.

In direct-conversion transmitters the most serious problem is that of local oscillator ("LO") feed-through due to a variety of on-chip coupling mechanisms. While the LO is necessary to convert the baseband signal to RF for transmission, if significant LO leakage occurs in the middle of the up-converted signal spectrum, the signal will be corrupted and rendered unreceivable.

Furthermore, in modern communication systems, the transmitter must be able to control the power that it is transmitting. The LO feed-through amplitude cannot be controlled as it is an unwanted byproduct of circuit non-idealities. This forces the transmitting signal to always be much larger than the LO feed-through.

Traditionally, LO feed-through can be reduced through the use of on-chip or external calibration schemes at the cost of additional hardware size and complexity.

Another problem in direct-conversion transmitters is in-phase and quadrature ("IQ") imbalance of the LO and signal path. Traditionally, direct conversion transmitters and receivers need a local oscillator with quadrature outputs for vector modulation and demodulation. However, when the quadrature signal components are not equal in amplitude and not exactly 90 degrees out of phase, the signal degrades in quality.

Quadrature phases are typically derived by passing a reference local oscillator through a CR-RC phase shift network. Ideally, this creates two signals with equal amplitude and 90 degrees of phase difference. However, this depends on the accuracy of resistors and capacitors which make up the phase shift network. The resistors and capacitors can vary by up to 15 percent in a typical integrated circuit causing the in-phase and quadrature components to have different amplitudes and a phase difference not equal to 90 degrees.

In addition, layout differences between the in-phase and quadrature paths can cause additional amplitude/phase imbalance. Contributing to further in-phase/quadrature imbalance, the circuits in the in-phase and quadrature paths (i.e. amplifiers and mixers) have physical properties that differ. Many feedback calibration schemes have been proposed and implemented to mitigate quadrature imbalance at the cost of hardware and/or system complexity.

A conventional direct conversion transmitter is illustrated in FIG. 1. As illustrated in FIG. 1, a direct conversion transmitter takes the modulated in-phase and quadrature baseband signals 100, 101 and translates the signal to an RF frequency by multiplying them by a quadrature LO. Specifically, the transmitter multiplies the baseband signals 100, 101 with two different phases 102, 103 of a local oscillator 107 using a first mixer 110 and a second mixer 111. The in-phase and quadrature baseband signals can be denoted $BB_I$ and $BB_Q$. The two phases 102, 103 of the local oscillator are 90 degrees apart and thus, are known as the in-phase ("I") 102 and quadrature ("Q") 103 components and can be denoted $LO_I$ and $LO_Q$ respectively. The mixer outputs 104, 105 are summed together to produce the RF signal 106. The RF signal 106 can be represented by Equation 1.

$$RF = BB_I \times LO_I + BB_Q \times LO_Q \qquad \text{Equation 1}$$

Another conventional direct conversion architecture is shown in FIG. 2. This differential direct conversion architecture is more resilient to self generated noise than the one illustrated in FIG. 1. In FIG. 2, the I and Q baseband signals are differential signals composed of positive and negative components. The equivalent single-ended baseband in-phase signal to the differential baseband in-phase signal is described by Equation 2. In Equation 2, $BB_I$ denotes the single-ended in-phase signal, $BB_{I,pos}$ denotes the positive component of the differential signal, and $BB_{I,neg}$ denotes the negative component of the differential signal. A differential signal has a positive and negative component which subtract to form the signal. Equation 3 describes the quadrature relationship in similar terms.

$$BB_I = (BB_{I,pos} - BB_{I,neg}) \qquad \text{Equation 2}$$

$$BB_Q = (BB_{Q,pos} - BB_{Q,neg}) \qquad \text{Equation 3}$$

In Equation 2 and Equation 3, $BB_{I,pos}$, $BB_{I,neg}$, $BB_{Q,pos}$, $BB_{Q,neg}$ correspond to 200, 201, 202, 203, respectively, in FIG. 2.

The differential direct conversion architecture shown in FIG. 2 uses differential LO signals to mix the baseband signal to RF. The polyphase network 205 is a circuit which converts the local oscillator voltage waveform 204 into four voltage waveforms 206, 207, 208, 209 at the same frequency as LO but at 0, 180, 90, 270 degrees offset compared to the local oscillator signal 204 respectively.

Collectively, these four signals 206, 207, 208, 209 are referred to as polyphase local oscillator signals. To facilitate the present description, the following signals 206, 207, 208, 209 are denoted as $LO^0$, $LO^{180}$, $LO^{90}$, $LO^{270}$ corresponding to their phase shift compared to the local oscillator 204. Shifting a sinusoidal signal 180 degrees in phase is the same as inverting the signal. Therefore, the equivalent single-ended in-phase and quadrature LO signals, denoted $LO_I$ and $LO_Q$, are described mathematically in Equations 4 and 5.

$$LO_I = LO^0 - LO^{180} \qquad \text{Equation 4}$$

$$LO_Q = LO^{90} - LO^{270} \qquad \text{Equation 5}$$

The differential quadrature baseband signals are routed to the differential mixers 210, 211 where they are multiplied by the differential local oscillator signals.

At the first mixer 210, the differential in-phase baseband signal ($BB_I$) is multiplied by the in-phase LO ($LO_I$). Likewise, at the second mixer 211, the differential quadrature baseband signal ($BB_Q$) is multiplied by the quadrature LO ($LO_Q$). Equation 6 describes the mixing process and summing process 212 of the differential signals to generate the RF signal 213. Likewise, Equation 7 is a simplified version of Equation 6 where all the differential signals are represented as single-ended signals.

$$RF=(BB_{I,pos}-BB_{I,neg})\times(LO^0-LO^{180})+(BB_{Q,pos}-BB_{Q,neg})\times(LO^{90}-LO^{270})$$ Equation 6

$$RF=BB_I\times LO_I+BB_Q\times LO_Q$$ Equation 7

Now, to elucidate the problems with direct conversion transmitters, LO feed-through and imbalance distortions will be added to Equations 6 and 7. LO feed-through is added to the output of the mixers. $LO_{C1}$ represents the differential LO feed-through from the polyphase LO signal to the output of mixer 210, and $LO_{C2}$ represents the differential LO feed-through at the at output of mixer 211. Likewise the amplitude and phase imbalance of the mixers and the polyphase LO signals can be accounted for at the output of each mixer. A complex multiplicative term, $A1e^{jP1}$, represents a random amplitude variation ("A1") and a random phase variation ("P1") introduced by the first mixer 210, the signal path 200, 201 and LO path 206, 207 connected to the mixer. Likewise, $A2e^{jP2}$ represents a random amplitude and phase variation introduced by the second mixer 211 and the signal 202, 203 and LO paths 208, 209 connected to it. Thus, with these distortions added, Equations 6 and 7 become Equations 8 and 9.

$$RF=(BB_{I,pos}-BB_{I,neg})\times(LO^0-LO^{180})\times A1e^{jP1}=LO_{C1}+(BB_{Q,pos}-BB_{Q,neg})\times(LO^{90}-LO^{270})\times A2e^{jP2}=LO_{C2}$$ 8

$$RF=BB_I\times LO_I\times A1e^{jP1}=LO_{C1}=BB_Q\times LO_Q\times A2e^{jP2}=LO_{C2}$$ Equation 9

As seen in Equations 8 and 9, the RF distortion grows as A1 and A2 differ and as P1 and P2 differ. As the distortion increase, it is harder for the signal to be received and decoded. Likewise as $LO_{C1}$ and $LO_{C2}$ increase, they become the dominant component of the RF signal in Equation 8 and 9.

There is thus a need for a transmitter for overcoming these problems and/or providing general improvements over prior art transmitters.

SUMMARY OF THE INVENTION

A system and method are provided for communicating a radio frequency (RF) signal. In use, a baseband signal is mixed with a plurality of oscillator signals with different phases in an interleaving manner. The mixed baseband signal is then communicated as an RF signal.

In one embodiment, the oscillator signals may include an oscillator signal frequency substantially equal to an RF signal frequency of the RF signal. Further, the RF signal may be modulated over a finite bandwidth.

In another embodiment, the oscillator signals may have phase differences of 0, 90, 180, and 270 degrees. Further, the mixing may be carried out by a plurality of mixers.

In use, the oscillator signals may be input to the mixers in the interleaving manner. Moreover, this may be accomplished by switching which oscillator signals are input to which mixers. Still yet, the switching may occur at a rate that is faster than a bandwidth of the RF signal. Optionally, the switching may occur in a substantially random manner, or even in a random manner.

In still another embodiment, the baseband signal may be inverted using an interleaving operation. Also, the baseband signal may be routed to at least one mixer using an interleaving operation. A plurality of the baseband signals may be provided including an in-phase baseband signal and a quadrature baseband signal.

DETAILED DESCRIPTION

Figure 1:
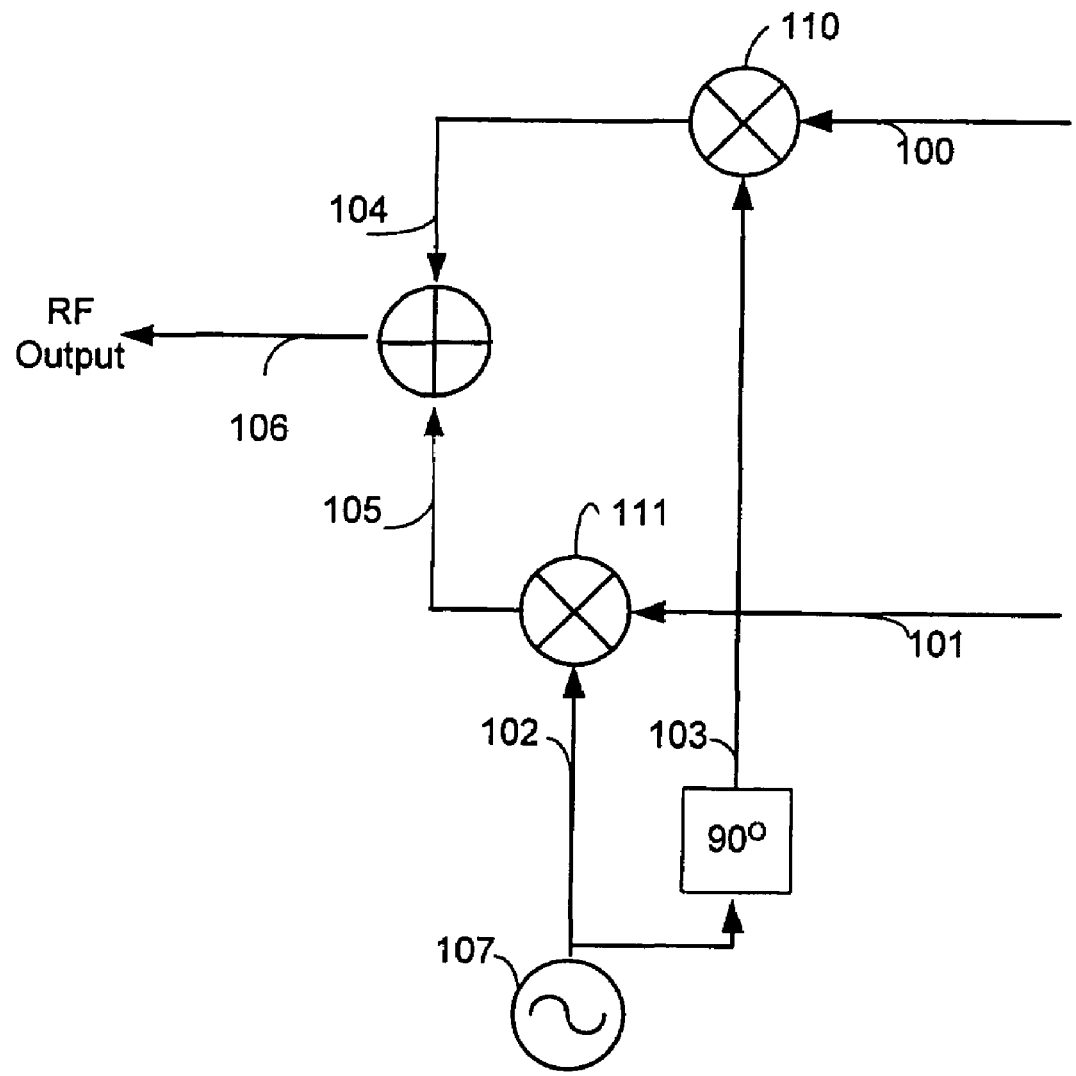
FIG. 1 is a block diagram of a conventional single-ended direct-conversion transmitter.
Figure 2:
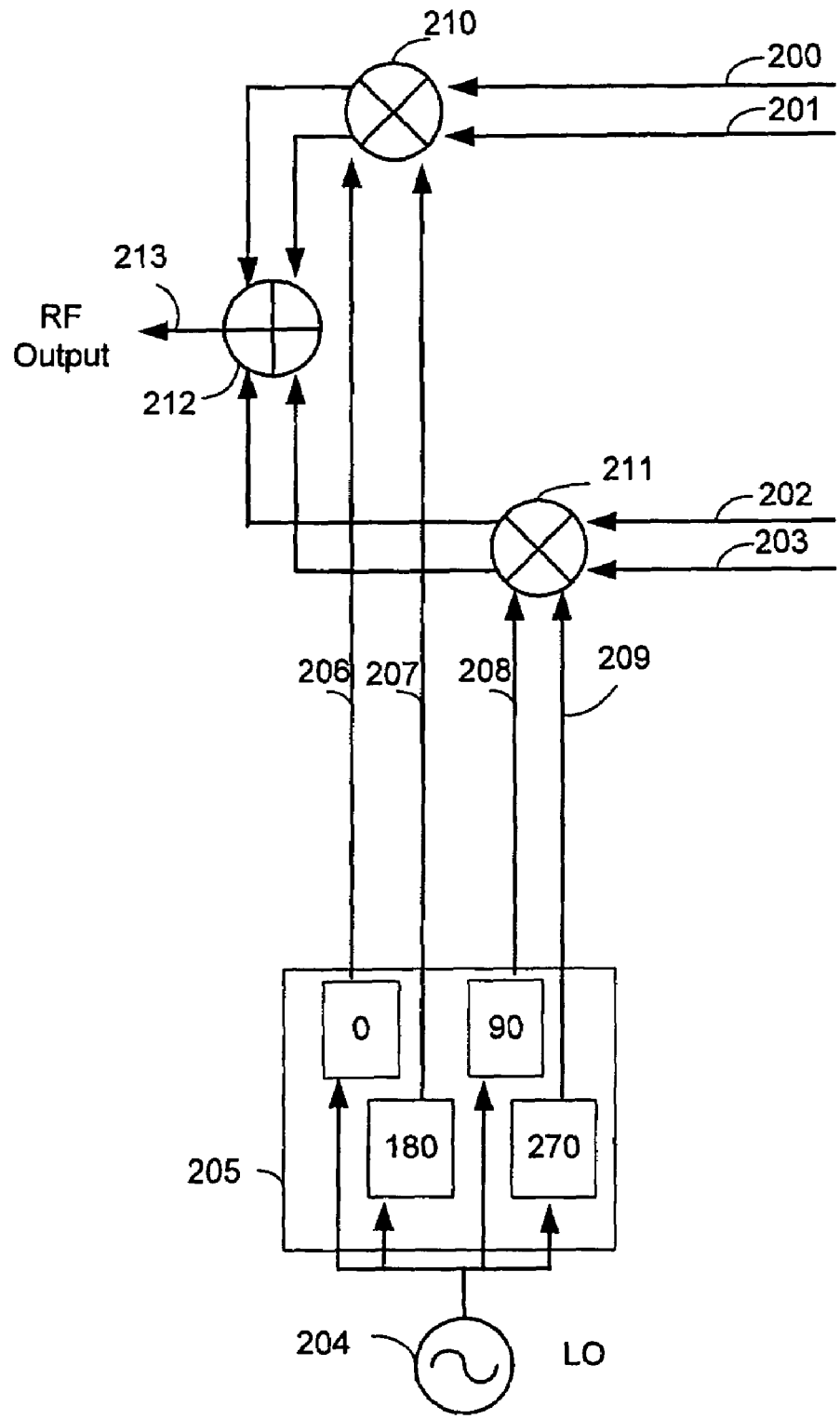
FIG. 2 is a block diagram of the conventional differential direct-conversion transmitter.
Figure 3:
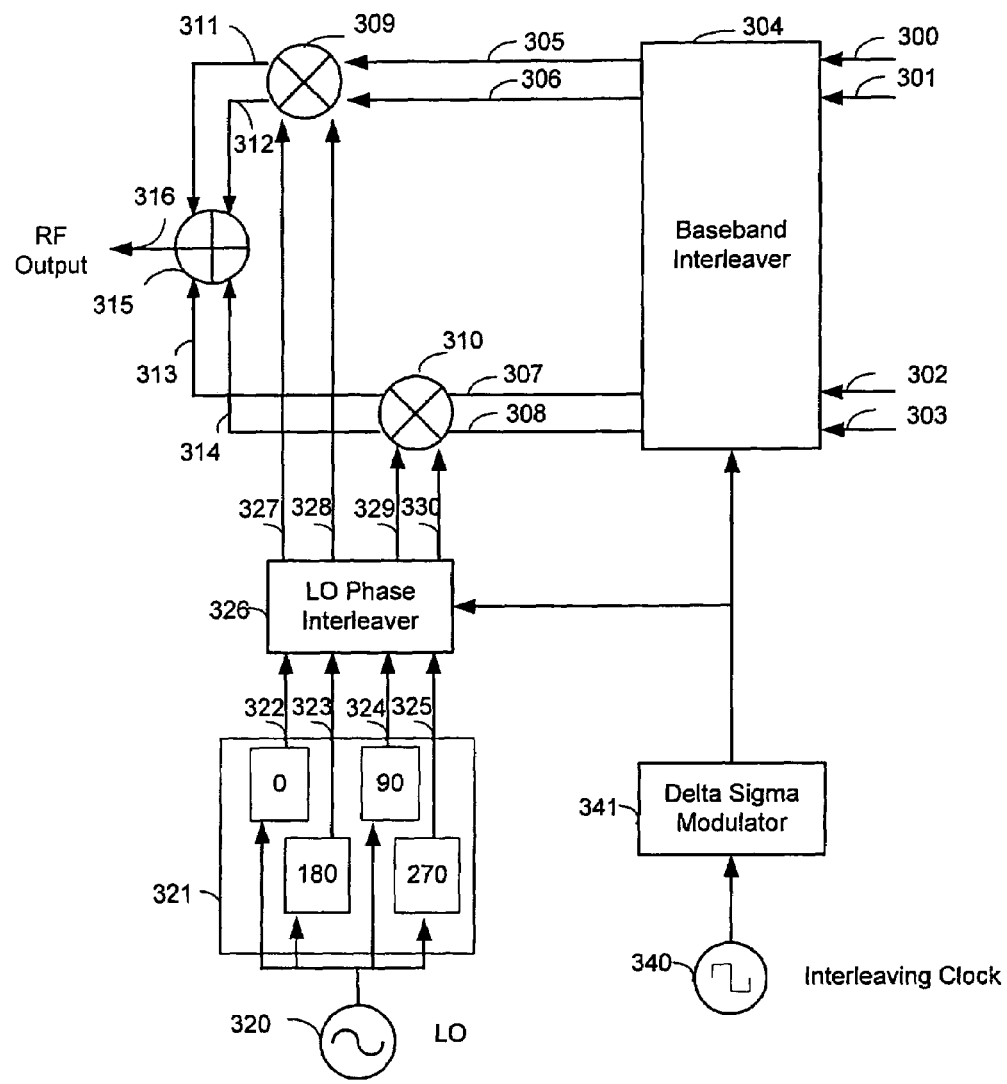
FIG. 3 is a block diagram of a differential direct-conversion transmitter with local-oscillator phase interleaving and baseband signal interleaving.

Turning to one embodiment in FIG. 3, the differential direct conversion architecture described in FIG. 2 is enhanced with two switching matrices: 1) the local oscillator phase interleaver ("LOPI") 326 circuit, and 2) the baseband interleaver ("BBI") 304. Each has four combinations of connections.

The BBI 304 routes the in-phase baseband signals 300, 301 and quadrature baseband signals 302, 303 to a first up-conversion mixer 309 and the second up-conversion mixer 310. Continuing the terminology established in the example of FIG. 2, the differential in-phase baseband signals are denoted $BB_{I,pos}$, $BB_{I,neg}$ while the differential quadrature signals are denoted $BB_{Q,pos}$, $BB_{Q,neg}$. By periodically switching the BBI configuration, the in-phase and quadrature baseband signals are routed alternately to each mixer. Thus, any imbalances in the baseband path affect the in-phase and quadrature signals similarly mitigating the adverse effect.

The baseband interleaver 304 circuit switches between one of four combinations of connections illustrated in FIG. 4. In addition, in two of the states it inverts the incoming baseband signals. In state 1 illustrated in FIG. 4a, the baseband interleaver passes $BB_{I,pos}$ 400 and $BB_{I,neg}$ 401 to the first mixer and $BB_{Q,pos}$ 402 and $BB_{Q,neg}$ 403 to the second mixer.

Figure 4A:
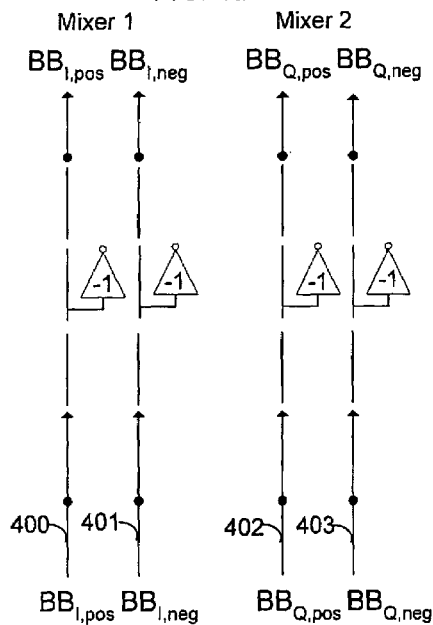
FIGS. 4a–d show the four configurations of the baseband signal interleaver.
Figure 4B:
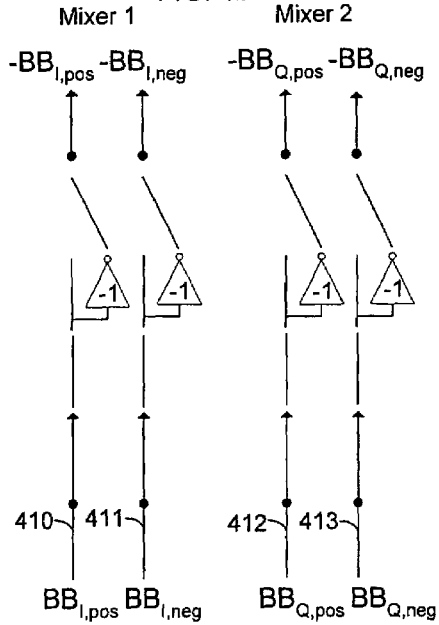
Figure 4C:
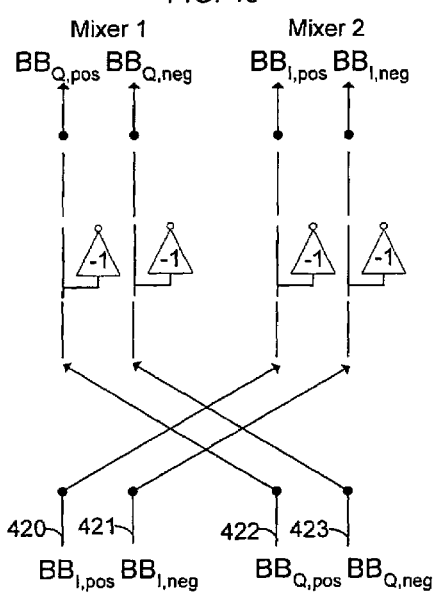

In the second state illustrated in FIG. 4b, the baseband interleaver inverts the incoming signals, $BB_{I,pos}$ 410 and $BB_{I,neg}$ 411, prior to routing them to the first mixer. Likewise, the baseband interleaver inverts $BB_{Q,pos}$ 412 and $BB_{Q,neg}$ 413 before routing them to the second mixer. In state 3 illustrated in FIG. 4c, $BB_{I,pos}$ 420 and $BB_{I,neg}$ 421 are routed to the second mixer while $BB_{Q,pos}$ 422 and $BB_{Q,neg}$ 403 are routed to the first mixer.

Figure 4D:
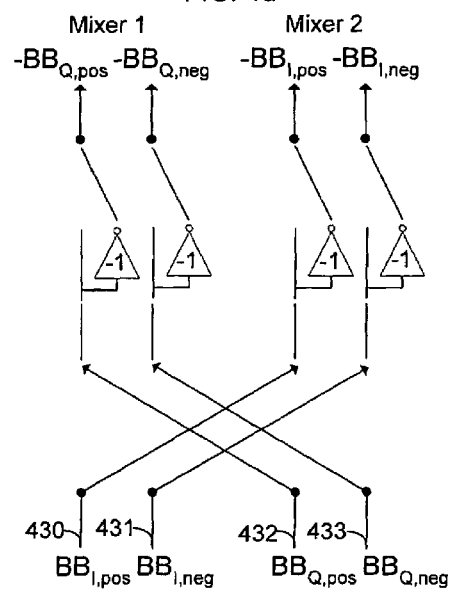

Finally in state 4 illustrated in FIG. 4d, the baseband interleaver inverts the incoming signals and routes the inverted $BB_{I,pos}$ 430 $BB_{I,neg}$ 431 to the second mixer and the inverted $BB_{Q,pos}$ 432 and $BB_{Q,neg}$ 433 to the first mixer. Returning to FIG. 3, the baseband signals 305, 306 arriving at the first mixer 309 are described by Equations 21, 22, 23, and 24.

State 1: $BB_{I,pos}-BB_{I,neg}$  Equation 21

State 2: $(-1)*BB_{I,pos}-(-1)*BB_{I,neg}$  Equation 22

State 3: $BB_{Q,pos}-BB_{Q,neg}$      Equation 23

State 4: $(-1)*BB_{Q,pos}-(-1)*BB_{Q,neg}$      Equation 24

To facilitate the description of this embodiment, Equations 21, 22, 23 and 24 can be represented by the notations $+BB_I$, $-BB_I$, $+BB_Q$, and $-BB_Q$ respectively. $+BB_I$ represents the differential in-phase baseband signal with positive polarity. $-BB_I$ represents the differential in-phase baseband signal with negative polarity. $+BB_Q$ represents the differential baseband signal with negative polarity. $-BB_Q$ represents the differential quadrature baseband signal with negative polarity.

Likewise, the baseband signals 307, 308 arriving at the second mixer 310 are described by Equations 25, 26, 27, and 28.

State 1: $BB_{Q,pos}-BB_{Q,neg}$      Equation 25

State 2: $(-1)*BB_{Q,pos}-(-1)*BB_{Q,neg}$      Equation 26

State 3: $BB_{I,pos}-BB_{I,neg}$      Equation 27

State 4: $(-1)*BB_{I,pos}-(-1)*BB_{I,neg}$      Equation 28

As in the case with Equations 21–24, the Equations 25, 26, 27 and 28 can be represented by the notations $+BB_Q$, $-BB_Q$, $+BB_I$, and $-BB_I$, respectively.

Returning to FIG. 3, the local oscillator 320 waveform is transformed by a polyphase circuit 321 into four waveforms 322, 323, 324, and 325 each at the same frequency as the LO but with a phase shift referenced to the local oscillator phase. To continue the terminology established in the example associated with FIG. 2, these four polyphase local oscillator signals 322, 323, 324, 325 will be denoted $LO^0$, $LO^{90}$, $LO^{180}$, $LO^{270}$ respectively.

The LO phase interleaver circuit 326 periodically switches configuration so that the $LO^0$ and $LO^{180}$ periodically are routed to the first mixer 309 and are periodically routed to the second mixer 310. Likewise, the LO phase interleaver 326 periodically routes $LO^{90}$ and $LO^{270}$ to the second mixer 310 and then to the first mixer 309. By switching the polyphase local oscillator signals to different mixers, it modulates the LO feed-though signal causing the LO feed-through peak energy to be reduced.

In the context of the present description, "interleaving" may refer to the plain and ordinary meaning thereof, as well as any sort of switching, exchanging, toggling, swapping, interchanging, etc.

Figure 5A:
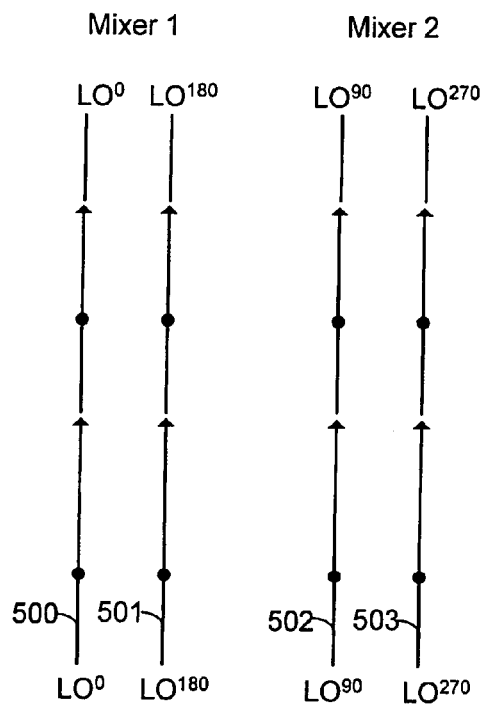
FIGS. 5a–d show the four configurations of the local-oscillator phase interleaver.
Figure 5B:
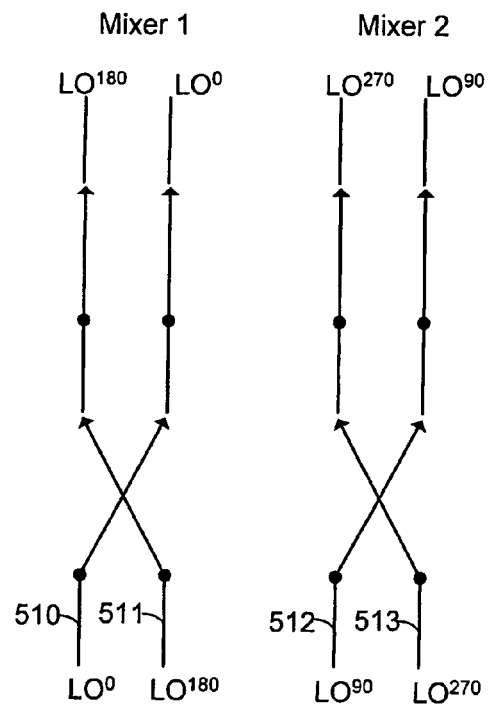

Four LOPI combinations are illustrated in FIGS. 5a, 5b, 5c and 5d. In state 1, as illustrated in FIG. 5a, $LO^0$ 500 and $LO^{180}$ 501 are routed to the first mixer and $LO^{90}$ 502 and $LO^{270}$ 503 are routed to the second mixer. In the second state, as illustrated in FIG. 5b, the $LO^0$ 510 and $LO^{180}$ 511 are routed to the first mixer; however, they have been interchanged compared to the routing in state 1 represented in FIG. 5a. The effect of this interchange is to reverse the polarity of the signal. Returning to FIG. 5b, $LO^{90}$ 512 and $LO^{270}$ 513 are routed to the second mixer; however, they too have been interchanged compared to state 1.

Figure 5C:
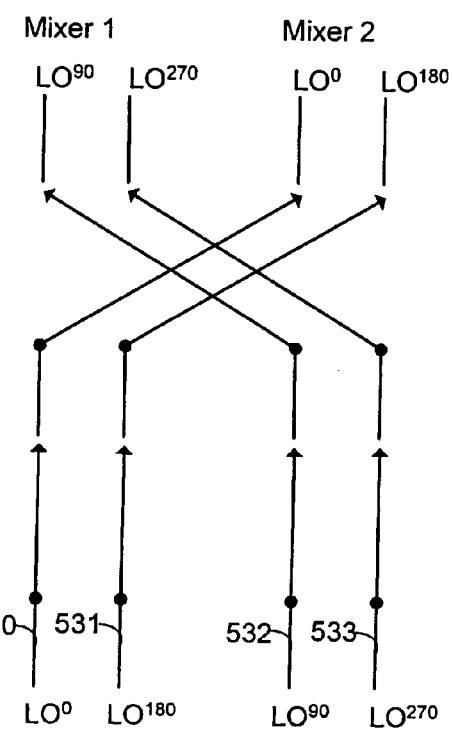
Figure 5D:
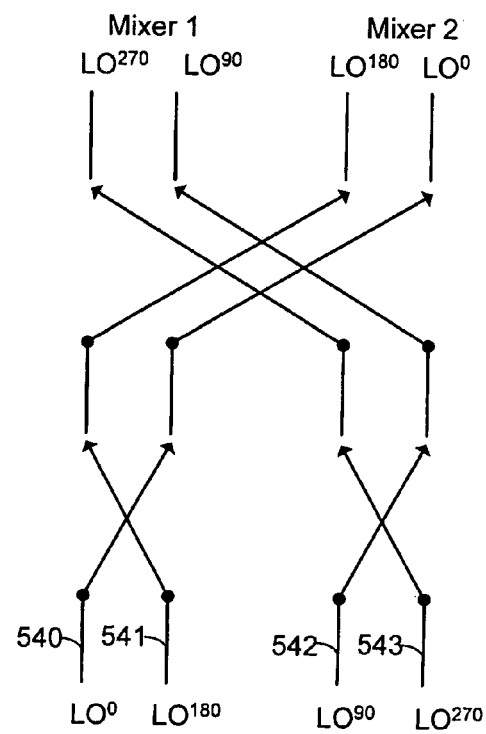

In state 3, as illustrated in FIG. 5c, $LO^0$ 530 and $LO^{180}$ 531 are routed to the second mixer and $LO^{90}$ 532 and $LO^{270}$ 533 are routed to the first mixer. In the fourth state, as illustrated in FIG. 5d, the $LO^0$ 540 and 0 $LO^{180}$ 541 are routed to the second mixer; however, they have been interchanged compared to the routing in state 3 represented in FIG. 5c. The effect of this interchange is to reverse the polarity of the signal. Returning to FIG. 5d, $LO^{90}$ 542 and $LO^{270}$ 543 are routed to the first mixer; however, they too have been interchanged compared to state 3.

Returning to FIG. 3, through the processes of local oscillator phase interleaving, each mixer input sees each polyphase LO signal $LO^0$, $LO^{90}$, $LO^{180}$, $LO^{210}$. Thus, if a phase or amplitude imbalance of one mixer distorts one LO component then it distorts all components. The LO signals 327, 328 arriving at the first mixer 309 are described by Equations 29, 30, 31 and 32. Likewise the LO signals 329, 330 arriving at the second mixer 310 are described by Equations 33, 34, 35 and 36.

State 1: $LO^0-LO^{180}$      Equation 29

State 2: $LO^{180}-LO^0$      Equation 30

State 3: $LO^{90}-LO^{270}$      Equation 31

State 4: $LO^{270}-LO^{90}$      Equation 32

State 1: $LO^{90}-LO^{270}$      Equation 33

State 2: $LO^{270}-LO^{90}$      Equation 34

State 3: $LO^0-LO^{180}$      Equation 34

State 4: $LO^{180}-LO^0$      Equation 36

To facilitate the present description, Equations 29, 30, 31 and 32 can be represented by the notations $+LO_I$, $-LO_I$, $+LO_Q$, and $+LO_Q$ respectively. $+LO_I$ represents the differential in-phase local oscillator signal with positive polarity. $-LO_I$ represents the differential in-phase local oscillator signal with negative polarity. $+LO_Q$ represents the differential local-oscillator signal with positive polarity. $-LO_Q$ represents the differential quadrature local-oscillator signal with negative polarity. As in the case with Equations 29–32, the Equations 33, 34, 35 and 36 can be represented by the notations $+LO_Q$, $-LO_Q$, $+LO_I$, and $-LO_I$ respectively.

The LO feed-through at the output of the first mixer 309 and the second mixer 310 is dependent on the LO signal applied to the mixer and the individual characteristics of the mixer itself. Therefore, the LO feed-through at the output of first mixer 309 can be defined by Equations 37, 38, 39, and 40 and the LO feed-through at the output of the second mixer 310 can be define by Equations 41, 42, 43, and 44. The LO feed-through is defined by three subscripts and a precedent sign in these equations. As it is a function of the mixer, the first subscript indicates which mixer the feed-through is associated with. The switch matrix determines the LO feed-through relative polarity represented by a +/– precedent sign and its second subscript represents the in-phase or quadrature LO component. The third subscript, F, distinguishes it from the LO signal.

State 1: $+LO_{1,I,F}$      Equation 37

State 2: $-LO_{1,I,F}$      Equation 38

State 3: $+LO_{1,Q,F}$      Equation 39

State 4: $-LO_{1,Q,F}$      Equation 40

State 1: $+LO_{2,Q,F}$      Equation 41

State 2: $-LO_{2,Q,F}$      Equation 42

State 3: $+LO_{2,I,F}$      Equation 43

State 4: $-LO_{2,I,F}$      Equation 44

A complex multiplicative term, $A1e^{jP1}$, represents a random amplitude variation ("A1") and a random phase variation ("P1") introduced by the first mixer 309, the signal path 305, 306 and LO path 327, 328 connected to the mixer. Likewise, $A2e^{jP2}$ represents a random amplitude and phase variation introduced by second mixer 310 and the signal 307,308 and LO paths 329,330 connected to it. Combining 315 the differential mixer outputs 311, 312, 313, 314 forms the RF output signal 316. The RF output corresponding to the four interleaving states is described by Equations 45, 46, 47 and 48.

State 1:

$$(+BB_I) \times (+LO_I) \times A1e^{jP1} + LO_{1,I,F} +$$
$$(+BB_Q) \times (+LO_Q) \times A2e^{jP2} + LO_{2,Q,F}$$

Equation 45

State 2:

$$(-BB_I) \times (-LO_I) \times A1e^{jP1} - LO_{1,I,F} +$$
$$(-BB_Q) \times (-LO_Q) \times A2e^{jP2} - LO_{2,Q,F}$$

Equation 46

State 3:

$$(+BB_Q) \times (+LO_Q) \times A1e^{jP1} + LO_{1,Q,F} +$$
$$(+BB_I) \times (+LO_I) \times A2e^{jP2} + LO_{2,I,F}$$

Equation 47

State 4:

$$(-BB_Q) \times (-LO_Q) \times A1e^{jP1} - LO_{1,Q,F} +$$
$$(-BB_I) \times (-LO_I) \times A2e^{jP2} - LO_{2,I,F}$$

Equation 48

Equations 45, 46, 47, and 48 can be reduced to Equations 49, 50, 51, and 52 by combining signs.

State 1:

$$BB_I \times LO_I \times A1e^{jP1} + LO_{1,I,F} +$$
$$BB_Q \times LO_Q \times A2e^{jP2} + LO_{2,Q,F}$$

Equation 49

State 2:

$$BB_I \times LO_I \times A1e^{jP1} - LO_{1,I,F} +$$
$$BB_Q \times LO_Q \times A2e^{jP2} - LO_{2,Q,F}$$

Equation 50

State 3:

$$BB_Q \times LO_Q \times A1e^{jP1} + LO_{1,Q,F} +$$
$$BB_I \times LO_I \times A2e^{jP2} + LO_{2,I,F}$$

Equation 51

State 4:

$$BB_Q \times LO_Q \times A1e^{jP1} - LO_{1,Q,F} +$$
$$BB_I \times LO_I \times A2e^{jP2} - LO_{2,I,F}$$

Equation 52

In Equations 49 through 52, it can be seen that the RF signal LO feed-through components, $LO_{1,I,F}$, $LO_{1,Q,F}$, $LO_{2,I,F}$, and $LO_{2,Q,F}$, oscillate between positive and negative values. This results in the LO feed-through energy being spectrally spread away from the desired signal spectrum.

Since the LO feed-through term is being modulated at a frequency of the interleaving clock 340, the LO feed-through is being spread with over a bandwidth equivalent to the frequency of the interleaving clock. As the interleaving clock frequency increases, the in-band distortion caused by the LO feed-through is reduced. Furthermore, by using a delta signal modulator 341 the switching behavior of the BBI and LOPI can be modified as to shape the spectral characteristics of the LO feed-through.

In Equations 49 through 52, it can be seen that the RF signal quadrature imbalance components $_{A1ejP1}$ and $A2e^{jP2}$ are each multiplied to both the in-band and quadrature baseband signal components. The RF in-phase component $BB_I*LO_I$ has is modified by two values: $A1e^{jP1}$ for states 1 and 2 and $A2e^{jP2}$ for states 3 and 4. The quadrature baseband signal follows the opposite pattern for amplitude and phase imbalance. When the in-phase and quadrature signal components are modified by the amplitude and phase distortions at a much higher frequency than their own modulation bandwidths, the two distortion products are averaged together in effect. This is shown in Equation 53.

$$RF=(BB_I*LO_I)*((A1e^{jP1}+A2)+(BB_Q*LO_Q)*((A1e^{jP1}+A2e^{jP2})/2)$$

Equation 53

So while the amplitude and phase distortion are still present in the RF signal, each signal component is distorted in the same fashion. Furthermore, the rapid switching of amplitude and phase distortion causes this distortion to be spread over a wide frequency and thus lowering its effects on in-band signal components.

The present embodiment may thus provide a solution for important drawbacks of direct conversion transmitters: LO feed-through and quadrature imbalance.

Figure 6:
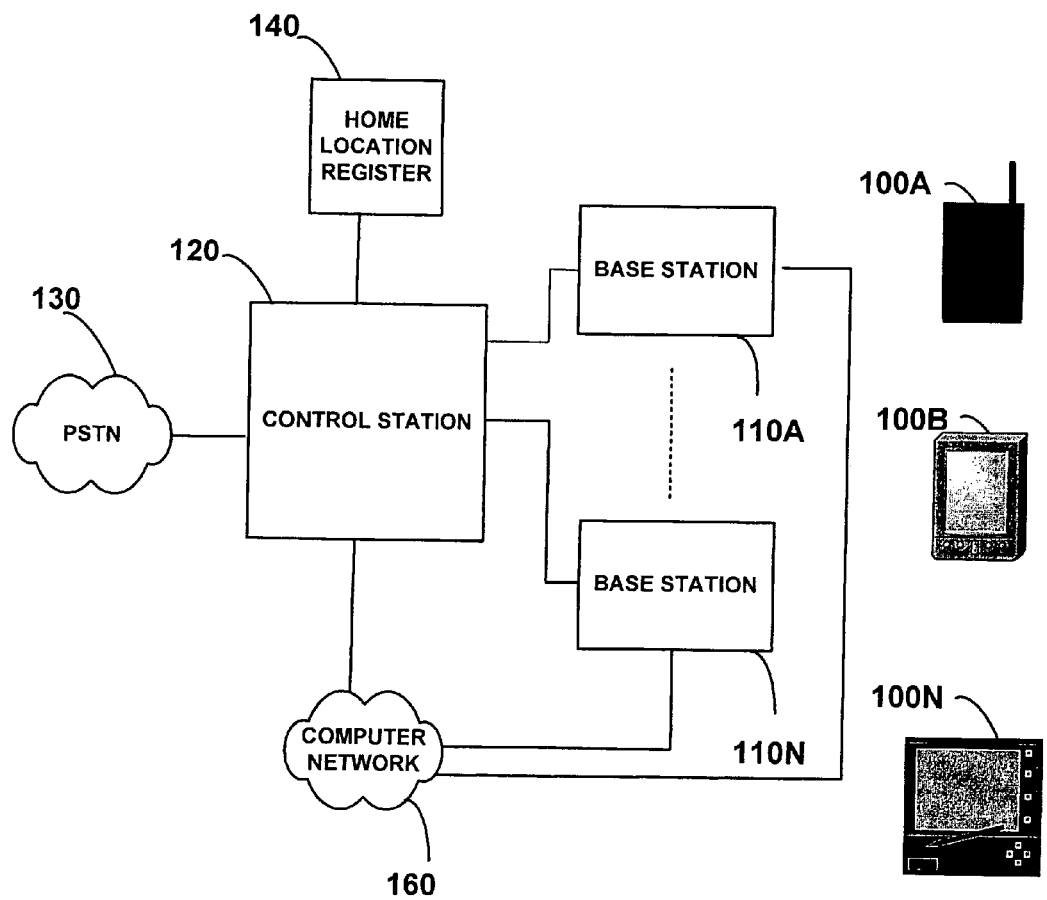
FIG. 6 is an illustration of a wireless communication system in which one embodiment may be used.

FIG. 6 is an illustration of a multi-mode wireless communication system in which one embodiment may be used. It should be understood that the components shown in FIG. 6 are merely representative of one mode of wireless communication system and that other communication systems may use different components in order to achieve similar, or even different results. For example, a wired transceiver communication system may also be employed. The claims, therefore, are not intended to be limited to the system shown in FIG. 6. For example, the present technology may be implemented in a single-mode system.

In the wireless communication system of FIG. 6, multi-mode, wireless communication devices, otherwise referred to herein simply as wireless communication devices, are shown as wireless communication devices 100a, 100b, and 100n, one or more wireless communication devices being assigned to each user in the system. The designations a, b, and n on the wireless communication device identifiers correspond respectively to a first user, a second user, and an nth user, representing "n" number of users in the communication system. Although only three wireless communication devices 100 are shown in FIG. 6, it should be understood that a wireless communication system typically comprises many thousands of users.

Referring again to FIG. 6, control station 120 typically includes interface and processing circuitry for providing system control to base stations 110a through 110n, representing one through "n" base stations comprising the wireless communication system. Base stations are provided for transmitting and receiving communication signals to and from wireless communication devices. Each base station 110 provides a coverage area ranging up to several miles in radius from the base station location. As wireless communication devices travel within the coverage area of each base station, communication signals to be transferred to and from the wireless communication device are routed generally through the particular base station to which the wireless communication device is most closely located.

Control station 120 provides circuitry for routing communications between wireless communication devices operating in various base station coverage areas, as well as between remote stations and land-line telephone users through a Public Switch Telephone Network, shown in FIG. 6 as the PSTN 130. Control station 120 may, alternatively, or in addition to, be connected to computer network 160 to provide communications between wireless communication devices in the communication system and various known computing devices connected to computer network 160, such as personal computers, mainframe computers, digital cameras, email systems, remotely controlled devices, and so on.

Control station 120 typically comprises a telecommunications switch (not shown) and a Base Station Controller (BSC) (also not shown). The telecommunication switch provides a switching interface to PSTN 130 while the BSC provides the necessary hardware and software for communications to take place between base stations. Control station 120 provides other functions in the communication system as well, such as billing services and data services.

Control station 120 may be coupled to the base stations by various means such as dedicated telephone lines, optical fiber links, or microwave communication links. When a call is initiated by a wireless communication device, a paging message is transmitted to one or more base stations proximate to the wireless communication device initiating the call, generally over a paging channel. The paging message is routed to control station 120, where it is processed and routed either to PSTN 130 or to one or more base stations proximate to a wireless communication device for which the call is intended. When a call is initiated from PSTN 130, a paging message is received by control station 120 where it is then converted into a format suitable for the particular wireless communication system.

In the exemplary embodiment, the wireless communication device 100 is able to communicate in at least two modes, or types, of communications, data communications and voice communications. Data communication mode is used when it is desirous to send or receive information generally suitable for digital computational devices, such as laptop computers. Data is generally transmitted in discreet segments called packets. Each data packet generally contains overhead information used for a variety of purposes. For example, many data packets contain a data field used to store an error detection code. The error detection code may be used to check a received data packet to ensure that it was received intact; that is, the data was not corrupted during the transmission process.

Voice communication mode is used when it is desirous to transmit acoustic information, including human speech, facsimile tones, music, or other audible forms of communication. In voice communication mode, audio information is transmitted using one or more well-known wireless communication modulation techniques, such as CDMA, TDMA, AMPS, and others.

During typical voice communications, an over the air channel is established between one or more base stations and a wireless telephone. The channel is maintained throughout the duration of the voice call, no matter how much or little voice activity is occurring between the wireless telephone and the base station. In many instances, voice data is digitized and formatted into packets prior to transmission. Voice packets differ from data packets in that no information as to a destination address is contained within the voice packets. That is, a connection is first established between two locations, then voice data is transmitted between the two locations. No address information need be contained within the voice packets as the source and destination of the voice packets are predetermined by the connection.

Data mode may further include a capability of transmitting voice in certain applications. In this scenario, voice is digitized. The digitized voice signals may be encrypted to provide for secure voice transmissions over the air. The digitized voice signals are then formatted into data packets, which are then transmitted over the air using well-known data transmission protocols. As explained above, each data packet contains information as to the address, or destination, of where the data packet is to arrive.

Figure 7:
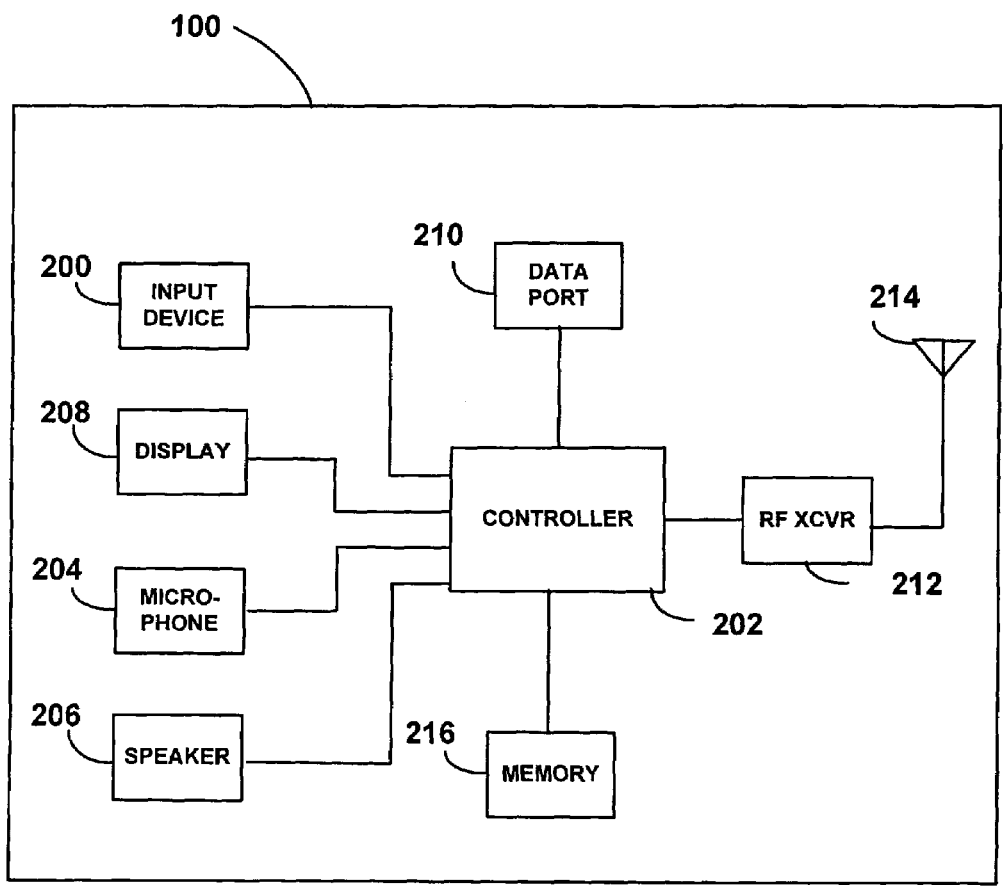
FIG. 7 illustrates the functional components of a wireless communication device, shown in block diagram format.

FIG. 7 illustrates the functional components of a wireless communication device, or wireless communication device, 100, shown in block diagram format. It should be understood that the components shown in FIG. 7 are merely representative of one mode of wireless communication device and that other communication devices may use different components in order to achieve similar, or even different results. The claims, therefore, are not intended to be limited to the system shown in FIG. 7.

Wireless communication device 100 is capable of multi-mode communications, meaning that it can operate in several modes of communications, such as voice communications or data communications. It should be understood that voice communications comprise any audio information including speech, music, or audible tones used for call processing, modems, and facsimile machines. Data communications comprise synchronous or asynchronous data transmission. In addition to these modes, wireless communication device is also capable of other modes of communications as well.

A user of wireless communication device 100 initiates communications generally by using input device 200. Input device 200 comprises a keypad in the exemplary embodiment, however, input device 200 could be any device which accepts user commands, such as a voice response device which converts voice commands into electrical signals suitable for processing by controller 202. During voice communications, the user speaks into microphone 204, which transforms acoustic energy into electrical energy and sends the electrical signals to controller 202 for processing.

Microphone 204 may be substituted for input device 200 in an application where a second audio input device is undesirable. In many instances, a voice encoder/decoder, generally known as a Codec, is used between microphone 204 and controller 202, or is incorporated within controller 202, to convert the electrical signals from microphone 204 into a format more suitable for transmission over a limited bandwidth air interface.

Speaker 206 is used to convert received electrical signals into acoustic signals. Speaker 206 may comprise a speaker suitable for low volume acoustic outputs, typically for use in a traditional telephone application, or speaker 206 may comprise a loudspeaker, suitable for high volume acoustic outputs, typically for use in a dispatch applications. In another embodiment, speaker 206 may comprise a combination of the high volume and low volume acoustic speakers.

Wireless communication device 100 further comprises display 208 for allowing a user to view operational characteristics of the wireless communication device. Such displays are common in many of today's wireless devices including telephones and remote data terminals.

Data port 210 serves as an interface between controller 202 and external hardware devices. Data port 210 generally allows a variety of bi-directional data communications to take place between wireless communication device 100 and the external device. Such external devices include laptop computers, facsimile machines, and remote data terminals, among others.

When a user initiates voice or data communications, an identification code corresponding to a second communication device, generally a telephone number, is entered using input device 200. In the exemplary embodiment, input device 200 comprises keys corresponding to digits 0 through 9, as well as additional function keys, such as SEND, END, and so forth. Input device 200 may also comprise one or more keys used to classify an outgoing communication as being a data communication or a voice communication.

For example, a user wishing to initiate a data communication might press a key designated for data communications, then dial a telephone number corresponding to a data device that the user wishes to communicate with. In one embodiment, all calls from wireless communication device 100 are assumed to be voice calls, unless classified as some other mode of communication, as described by one of the methods above.

Controller 202 serves as the main computational unit of wireless communication device 100. Although controller 202 is shown as a single element in FIG. 7, it should be understood that controller 202 may comprise one or more individual components such as one or more Application Specific Integrated Circuits (ASICs) in combination with memory devices, bus controllers, and other support devices well known to those skilled in the art.

To facilitate the transmission and receipt of wireless RF signals in the foregoing context, an RF transceiver 212 and an antenna 214 are coupled to controller 202 for sending and receiving such signals. Similar to the controller 202, one or more ASICs in combination with memory devices, bus controllers, etc. may be used to provide the RF transceiver 212. Moreover, the aforementioned direct-conversion receiver may be incorporated into the RF transceiver 212 and/or controller 202 in any desired capacity for providing an improved system.

Working in conjunction with the controller 202 is memory 216. The memory 216 is a device used to store information represented in digital format. Examples of memory 216 include random access memory (RAM), electrically erasable programmable read-only memory (EEPROM), non-volatile memory, and other known storage devices.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for communicating a radio frequency (RF) signal, comprising:
   generating an interleaved baseband signal by selectively interchanging a routing of a plurality of baseband signals according to an interleaver operation;
   mixing the interleaved baseband signal with a plurality of oscillator signals with different phases in an interleaving manner, the interleaving manner related to the interleaver operation; and
   communicating the mixed baseband signal as the RF signal.

2. The method as recited in claim 1, wherein the method is carried out by a transmitter.

3. The method as recited in claim 1, wherein the oscillator signals include an oscillator signal frequency substantially equal to an RF signal frequency of the RF signal.

4. The method as recited in claim 1, wherein the oscillator signals have phase differences of 0, 90, 180, and 270 degrees.

5. The method as recited in claim 1, wherein the mixing is carried out by a plurality of mixers.

6. The method as recited in claim 5, wherein the oscillator signals are input to the mixers in the interleaving manner.

7. The method as recited in claim 6, wherein the oscillator signals are input to the mixers in the interleaving manner by switching which oscillator signals are input to which mixers.

8. The method as recited in claim 1, wherein the plurality of baseband signals is provided including an in-phase baseband signal and a quadrature baseband signal.

9. A method for communicating a radio frequency (RF) signal, comprising:
   mixing, using a plurality of mixers, a baseband signal with a plurality of oscillator signals with different phases in an interleaving manner, wherein the oscillator signals are input to the plurality of mixers in the interleaving manner by switching which of the plurality of oscillator signals are input to which mixers, and wherein the switching occurs at a rate that is faster than a bandwidth of the RF signal; and
   communicating the mixed baseband signal as the RF signal.

10. The method as recited in claim 9, wherein the switching occurs in a substantially random manner.

11. A method of quadrature balancing and Local Oscillator (LO) feedthrough suppression, the method comprising:
   selectively interchanging a routing of an in-phase (I) baseband signal and a quadrature (Q) baseband signal according to an interleaving operation to generate a first interleaved I and Q baseband signal and a second interleaved I and Q baseband signal;
   frequency converting the first and second interleaved I and Q baseband signals to first and second RF signals, respectively, using a plurality of oscillator signals with different phases, the different phases of the plurality of oscillator signals based in part on the interleaving operation; and
   combining the first and second RF signals.

12. An apparatus for quadrature balancing and Local Oscillator (LO) feedthrough suppression of a transmit signal, the apparatus comprising:
   a baseband interleaver configured to receive an in-phase (I) baseband signal and a quadrature (Q) baseband signal and generate a first interleave signal at a first output by selectively routing the I baseband signal to the first output during a first time interval and selectively routing the Q baseband signal to the first output during a second time interval, and generate a second interleaved signal at a second output by selectively routing the Q baseband signal to the second output during the first time interval and selectively routing the I baseband signal to the second output during the second time interval;

a first mixer having a signal input coupled to the first output of the baseband interleaver, a signal output, and a LO input;

a second mixer having a signal input coupled to the second output of the baseband interleaver, a signal output, and a LO input;

a local oscillator interleaver configured to receive a plurality of LO signals corresponding to a plurality of phases, and generate a first interleaved LO signal that is coupled to the LO input of the first mixer and a second interleaved LO signal that is coupled to the LO input of the second mixer, the first interleaved LO signal having a first phase during the first time interval and a second phase during the second time interval, and the second interleaved LO signal having the second phase during the first time interval and the first phase during the second time interval; and a combiner coupled to the signal outputs of the first and second mixers.

* * * * *